United States Patent Office 3,701,811
Patented Oct. 31, 1972

3,701,811
ALKYLATION OF PHENOLS
Thomas Nicklin, Middleton, England, assignor to The Gas Council, London, England
No Drawing. Filed Apr. 14, 1969, Ser. No. 816,046
Int. Cl. C07c 37/16
U.S. Cl. 260—621 R          4 Claims

ABSTRACT OF THE DISCLOSURE

Phenols having either or both of the ortho positions available for substitution are alkylated with an alkyl group having up to three carbon atoms by contacting the phenol and the alkanol corresponding to the alkyl group with a catalyst comprising cerium oxide and uranium oxide. The active ingredients are preferably disposed on the surface of a catalyst carrier, and the process is particularly useful in the methylation of phenol itself.

---

The invention relates to the alkylation of phenols. More particularly, the invention relates to a process for the production of methyl substituted phenols.

Sharp et al. have described and performed the synthesis of cresols and xylenols by passing methanol and phenol in the vapour phase into the presence of a catalyst formed of ceric oxide (see Coal Tar Research Association Reports Nos. 0374, 0375). Processes involving such catalysts appear to suffer from the disadvantages of a comparatively low degree of selectivity resulting in by-product formation.

It has now been found that improved reaction selectivity and catalyst life can be obtained by the use of a catalyst comprising in addition uranium and an inert catalyst carrier.

According to the present invention there is provided a process for the nuclear substitution of a phenol which is unsubstituted and sterically unhindered in one or both of the 2 and 6 positions, with an alkyl group having from 1 to 3 carbon atoms, which process comprises contacting a gaseous mixture of the phenol and the alkanol corresponding to the alkyl group with a catalyst composition, the essential active components of which are cerium oxide and a uranium oxide.

The catalyst used in the process of the present invention preferably comprises a catalyst carrier, on the surface of which the active components of the composition are disposed. The preferred catalyst carrier is α-alumina, but other inert carriers such as γ-alumina, silicon carbides, silica and natural clays, molecular sieves, silicon carbide, alumino silicates or zirconium silicates or mixtures thereof may also be used.

The ratio, by weight, of the proportions of cerium to uranium present in the catalyst composition is desirably from 1:5 to 2:1, preferably from 2:10 to 6:10 and more preferably not greater than 4:10, i.e. a ratio in which uranium is present in at least that proportion which corresponds to the stoichiometric proportion of uranium present in the notional cerous monomanate, $Ce_2(UO_4)_3$. Thus for a catalyst having about 4% cerium, by weight of the composition, the uranium is preferably present in a proportion of not less than 10.2%, that is, at least about 2.5 times as much uranium as cerium.

By the proportion of cerium or uranium present in the active components of the composition is meant the proportion of that element present in the active components.

The catalyst carrier may be shaped. For example it may be in the form of small spheres, rings or hollow cylinders.

The catalyst composition used in the process of the invention may be formed in a number of ways known in the art. A convenient way of forming the composition involves impregnating a carrier with a mixture of nitrates of uranium and cerium and then calcining the thus impregnated carrier at about 450° C. to form the oxides of the two metals.

The phenol to be alkylated by the process of the invention may be already substituted, provided either or both of the 2 or 6 positions are unsubstituted and sterically unhindered. Examples of phenols which may be alkylated include alkyl phenols, amino-phenols and, especially phenol itself.

Preferably the process is conducted at a temperature of from 450° C. to 750° C., for example 700° C., more preferably of from 500° C. to 650° C., for example 550° C.

A gradual decline of catalyst activity occurs as the process continues. When the drop in activity becomes marked the original level may be restored, however, and in some cases increased by blowing air through the catalyst over several hours. The drop in activity appears to be due to deposition on the catalyst of carbonaceous matter.

Analysis of products obtained by the process of the invention showed not even traces of meta- or para-substituted phenyl compounds. Side-chain alkylation products were also absent. Thus in the case of the methylation of phenol the only products obtained were 2,6-xylenol, ortho-cresol and certain quantities of n-butanol and isopropanol.

It is believed that the mechanism of the alkylation is not free radical, but electronic, in nature, the active alkylating species being a carbonium ion. Such a mechanism would account for the absence of meta substitution and side-chain methylation, but not the almost total absence of para- substitution. The latter may be due to slightly higher electron density at the two ortho positions.

When air blowing is used the greater the frequency of air blowing the greater the proportion of the 2:6 substituted compound (if both 2 and 6 positions were initially unsubstituted) which is produced at the expense of the proportion or singly substituted product. It may be desirable to recycle the mixture through the catalyst chamber a number of times in order to improve the yield.

A modification of the process of the invention involves the continuous admission of air to the catalyst. The activity of the catalyst is thus maintained at a high level and a high yield of 2:6 product achieved without the need for frequent pauses in the process for air blowing.

In order that the invention may be more easily understood, two specific examples of the catalyst and process of the invention will now be described.

EXAMPLE 1

The catalyst used in this example was prepared by forming a melt of 300 gm. of uranyl nitrate and 100 gm. of cerous nitrate and dipping therein 4 mm. diameter spherules of α-alumina. The impregnated spherules were then removed from the melt and calcined at 450° C. The resulting catalyst comprised oxides of cerium and of uranium impregnated on alpha-alumina and comprised 4.1% cerium and 18.1% uranium each in the form of the oxides.

The catalyst was placed in a reactor of approximately 1 inch in diameter by 2 ft. in length was maintained in an electric furnace at 550° C. A feedstock of 2 moles of methanol and 1 mole of phenol were admitted to the reactor via a metre pump and an electric preheater. The apparent reactant contact time was maintained at 10 seconds. Pressure was approximately atmospheric. The initial liquid product obtained had the analysis:

| | Percent |
|---|---|
| Methanol | 1.1 |
| n-butanol | 0.4 |
| Phenol | 44.4 |
| O-cresol | 25.6 |
| 2:6 xylenol | 6.4 |
| Water | Balance |

The entire product from this run was then mixed with a further 2 moles of methanol per original mole of phenol and passed through the reactor. The liquid product had the analysis:

| | Percent |
|---|---|
| Methanol | 2.0 |
| Isopropanol | 8.4 |
| n-butanol | Trace |
| Phenol | 48.0 |
| O-cresol | 12.7 |
| 2:6 xylenol | 5.9 |

Further passage of the product of this run with a further two moles of methanol per original mole of phenol gave a product of still lower o-cresol content, i.e. it was not possible to obtain methylation beyond the original reaction product stage by processing with further methanol.

Subsequent runs using this catalyst with 2 moles/1 mole methanol/phenol ratio at a reactor temperature of 550° C. showed that a loss of activity had occurred, a typical reaction product having the composition:

| | Percent |
|---|---|
| Methanol | 1.1 |
| Phenol | 65.8 |
| O-cresol | 16.4 |
| 2:6 xylenol | 2.9 |

Loss of activity may well have been due to a build-up on the catalyst surface of complex aromatic compounds derived from phenol. It was therefore decided to blow air over the catalyst overnight.

On resuming operation, using again a solution of phenol (1 mole) in methanol (2 mole) the product obtained had the composition:

| | Percent |
|---|---|
| Methanol | 0.9 |
| Phenol | 24.7 |
| O-cresol | 37.5 |
| 2:6 xylenol | 14.6 |

However, over a period of several hours, the activity of the catalyst as indicated by the o-cresol content of the product fell from 37.5% to 27.2%.

EXAMPLE 2

The catalyst was prepared as in Example 1 and resulted in a composition comprising: 4.4% cerium, 20.0% uranium each present in the form of oxides.

The same plant as was used in Example 1 was put to work in the same way in this example using a feed having a methanol/phenol ratio of 2 moles/mole. The temperature and contact time were each as in Example 1.

The first sample of product had the analysis:

| | Percent |
|---|---|
| Methanol | 0.4 |
| Phenol | 35.6 |
| O-cresol | 34.8 |
| 2:6 xylenol | 10.7 |

The entire charge of feedstock to the plant was processed then the catalyst was air-blown for 1 hour. 2 moles methanol/mole original phenol were then added to the entire product and the mixture was re-processed under the same conditions as described above. The product had the analysis:

| | Percent |
|---|---|
| Methanol | 0.4 |
| Phenol | 13.6 |
| O-cresol | 39.0 |
| 2:6 xylenol | 27.4 |

The catalyst was then air-blown for a further period of 1 hour, followed by passage through the reactor of the entire product from the previous stage plus a further 2 moles of methanol per mole of original phenol. The product obtained had the analysis:

| | Percent |
|---|---|
| Methanol | 0.6 |
| Phenol | 2.04 |
| O-cresol | 20.5 |
| 2:6 xylenol | 53.8 |

A run was then performed in which air was admitted continuously with the above product plus further methanol. The feed to the reactor was therefore:

Product from previous stage
2 moles methanol per original mole of phenol
½ mole air per original mole of phenol.

The product obtained had the analysis:

| | Percent |
|---|---|
| Methanol | Traces |
| Phenol | 0.75 |
| O-cresol | 8.9 |
| 2:6 xylenol | 66.0 |
| Trimethyl phenol | Trace |

It is to be understood that the invention further provides an alkylated phenol, in particular o-cresol and 2:6 xylenol whenever prepared by the process of the invention.

We claim:
1. A process for the nuclear alkylation of a phenol at one or both of the 2 and 6 positions with an alkyl group having 1 to 3 carbon atoms, said phenol being unsubstituted and sterically unhindered at a position where alkylation is to occur and being selected from the group consisting of phenol, alkyl phenols and amino phenols, said process comprising:

contacting a gaseous mixture of the phenol and an alkanol having 1 to 3 carbon atoms with an effective amount of a supported catalyst composition comprising a cerium oxide and an uranium oxide, the weight ratio of cerium to uranium in said composition being in the range of from about 2:10 to about 20:10; and maintaining the temperature of said gaseous mixture during said contacting within the range of from about 450° C. to about 750° C. to produce a reaction product containing an alkylated phenol.

2. A process as set forth in claim 1 wherein said phenol is unsubstituted phenol and said alkanol is methanol.

3. A process as set forth in claim 2 wherein said composition contains at least about 2.5 times by weight as much uranium as cerium.

4. A process as set forth in claim 1 wherein air is admitted to the catalyst composition during the process.

References Cited

UNITED STATES PATENTS 2,448,942   9/1948   Winkler et al. ____ 260—624 C X
2,921,032   1/1960   Linn _____ 260—624 C X BERNARD HELFIN, Primary Examiner N. MORGENSTERN, Assistant Examiner U.S. Cl. X.R.

252—455 R, 455 Z, 467; 260—571, 624 C